No. 870,127. PATENTED NOV. 5, 1907.
E. V. POSEY.
PLOW.
APPLICATION FILED JULY 11, 1907.
2 SHEETS—SHEET 1.
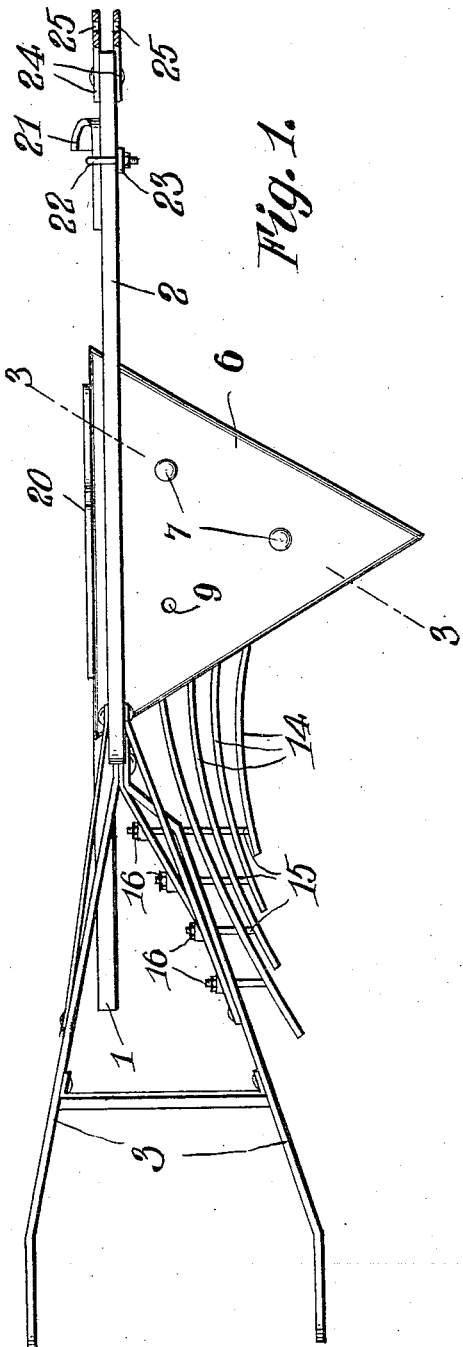
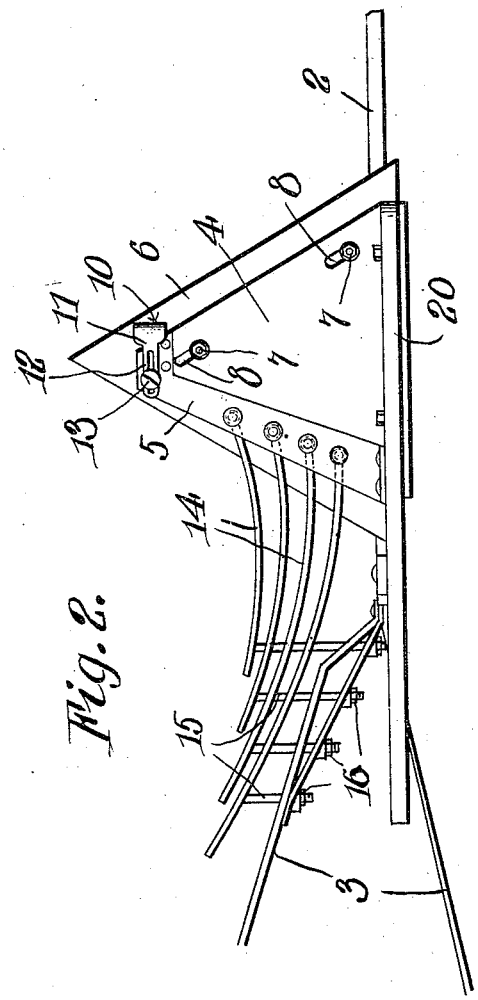
Witnesses
Arthur Wesley
C. H. Griesbauer
Inventor
Edward V. Posey.
by H. B. Wilson & Co
Attorneys No. 870,127. PATENTED NOV. 5, 1907.
E. V. POSEY.
PLOW.
APPLICATION FILED JULY 11, 1907.
2 SHEETS—SHEET 2.
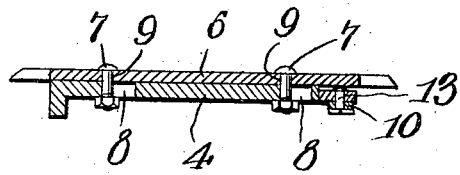
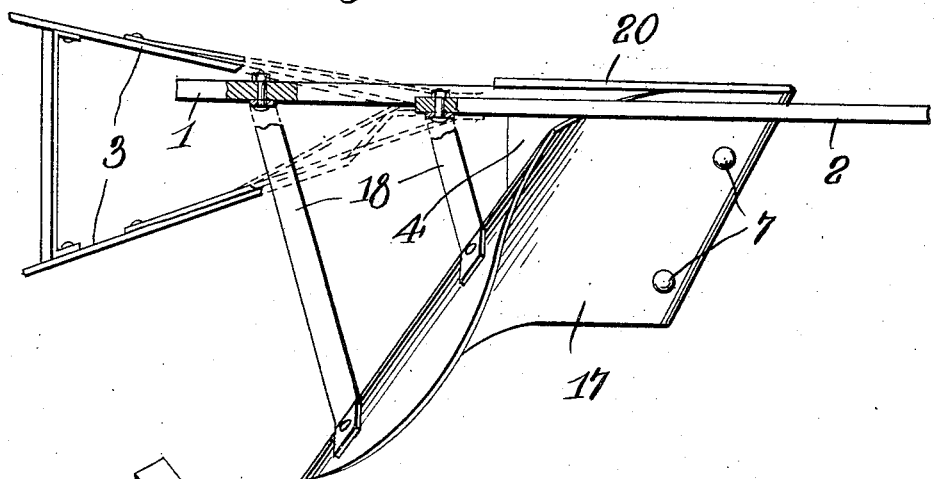
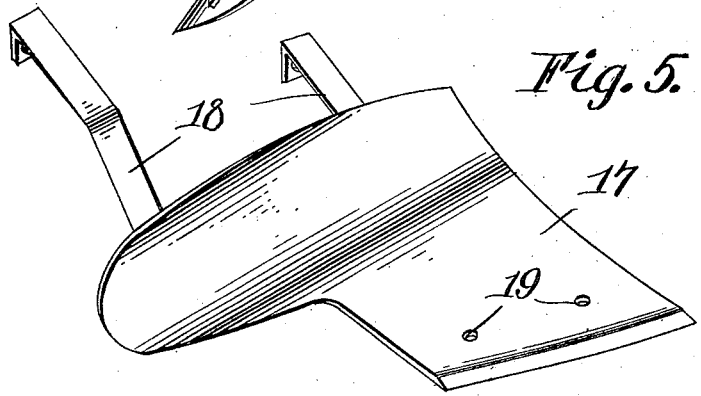
Witnesses
Arthur Wesley
C. H. Griesbauer
Inventor
Edward V. Posey.
by H. B. Wilson & Co.
Attorneys

UNITED STATES PATENT OFFICE.

EDWARD V. POSEY, OF GAGE, OKLAHOMA TERRITORY.

PLOW.

No. 870,127.   Specification of Letters Patent.   Patented Nov. 5, 1907.

Application filed July 11, 1907. Serial No. 383,297.

*To all whom it may concern:*

Be it known that I, EDWARD V. POSEY, a citizen of the United States, residing at Gage, in the county of Woodward and Territory of Oklahoma, have invented certain new and useful Improvements in Plows; and I do declare the following to be a full, clear, and exact description of the invention, such as will enable others skilled in the art to which it appertains to make and use the same.
This invention has relation to new and useful improvements in breaking plows and has for its object the production of a plow especially adapted for breaking new or hilly ground.

With the foregoing and other objects in view which will appear as the nature of the invention is better understood, the invention consists in certain novel features of construction, combination and arrangement of parts as will be hereinafter fully described and claimed.

In the accompanying drawings, Figure 1 is a plan view of a plow constructed in accordance with the invention, the mold-board removed, with the front part of the plow beam broken away. Fig. 2 is a bottom plan view thereof. Fig. 3 is a sectional view on the line 3—3 of Fig. 1. Fig. 4 is a plan view of a modified form of the plow with the handles removed and the mold-board in position and with parts broken away; and Fig. 5 is a detail perspective view of the solid mold-board shown in Fig. 4 detached.

Referring to the drawings for a better understanding of the invention, 1 indicates the landside or land-bar, 2 the plow beam which is bolted or otherwise secured thereto and 3 the handles. Preferably integral with the forward end and extending laterally from one side of the landside or bar is a horizontal wing-plate 4 and extending also from said side and parallel with and adjacent the rear edge of said wing-plate is a horizontal arm or bar 5 which is riveted or otherwise secured at its inner end to said land-side and at its opposite end to the outer end of said wing-plate. A share or lay 6 preferably in the form of an equilateral triangle is adjustably secured to said wing-plate by screws 7 working through elongated slots 8 near and substantially parallel with the front edge of said wing-plate and screwing in screw-threaded apertures 9 in said share or lay.
All three of the edges of said share or lay are sharp so that when one edge has become dulled, one of the other sharp edges may be employed. The lay or share is self-sharpening, that is to say its construction is such that the top edges thereof are sharpened as the bottom edges become worn, and because of this fact, the lay or share does not have to be removed from position, after all three edges have been turned or presented to the front, but the lay simply is to be turned over. An adjustable member 10 comprising a body portion 11 and a longitudinally slotted stem or shank 12 is adjustably secured to or near the outer end of said arm or bar 5 by a screw 13 and may be adjusted longitudinally of the plow to cause it to run level. A series of curved rods 14 of gradually increasing length are pivotally connected at their front ends to the upper face of said frame or bar 5 by screws or other equivalent means and are provided near their free ends with laterally projecting stems 15 adapted to work through corresponding transverse apertures or openings near the inner end of one of the handles 3. These stems or fingers are preferably threaded at their free ends to receive nuts 16 for holding them in position to said handle. Said rods serve as a mold-board for the plow.

The metallic mold-board 17 of suitable form is provided on one face with two preferably parallel fastening bars or members 18 by means of which said mold-board may be secured in position to the land-side. Said mold-board is also provided near its front edge with two screw-threaded apertures or openings 19 adapted to receive the upper ends of said screws 7 when secured in position to the plow. When said mold-board is employed, said curved rods 14 are removed from position and it will be seen from the construction disclosed that this may be easily done. By having said share or lay adjustable laterally with respect to the plow, it may be moved forwardly to compensate for the wear of its cutting edges.

The numeral 20 indicates a standing cutter or colter which is riveted or otherwise secured to the forward end of the land-side opposite said share or lay. A gage 21 is adjustably secured near the front or forward end of the plow beam by a suitable clip and clamping plate 22 and 23 respectively. The extreme front ends of said beam are provided with two oppositely-disposed extensions or jaws 24 each having a vertical series of apertures 25 to receive a clevis or other draft attaching means.

From the foregoing description, taken in connection with the accompanying drawings, the construction and operation of the invention will be readily understood without requiring a more extended explanation.

Having thus described my invention, what I claim as new is:—

1. In a plow, the combination of a land-side having a laterally-projecting wing-plate at its forward end and a triangular shaped share adjustably and reversibly secured to said wing-plate.

2. In a plow, the combination with a land-side having a laterally-projecting wing-plate near one end of a triangular-shaped share secured to said wing-plate and adapted for lateral adjustment and a plow leveling member secured near the outer end of said wing-plate which is adapted for longitudinal adjustment with respect to the plow.

3. In a plow, the combination with a land-side having a standing cutter and a laterally-projecting wing-plate at its forward end, of a share having a plurality of cutting edges secured to said wing-plate and adjustable laterally of the plow, and a longitudinally disposed plow leveling member adjustably secured under and near the outer end of said wing-plate.

4. In a plow, the combination with a land-side having a laterally projecting wing at one end and provided with spaced slots, of a share having a plurality of cutting edges, and screws extending through said slots and engaging said share.

In testimony whereof I have hereunto set my hand in presence of two subscribing witnesses.

EDWARD V. POSEY.

Witnesses:
IRVIN O. McCOLLOUGH,
C. S. JACKS.